No. 807,193. PATENTED DEC. 12, 1905.
H. B. NICHOLS.
GRINDING MACHINE.
APPLICATION FILED FEB. 28, 1905.
8 SHEETS—SHEET 7.
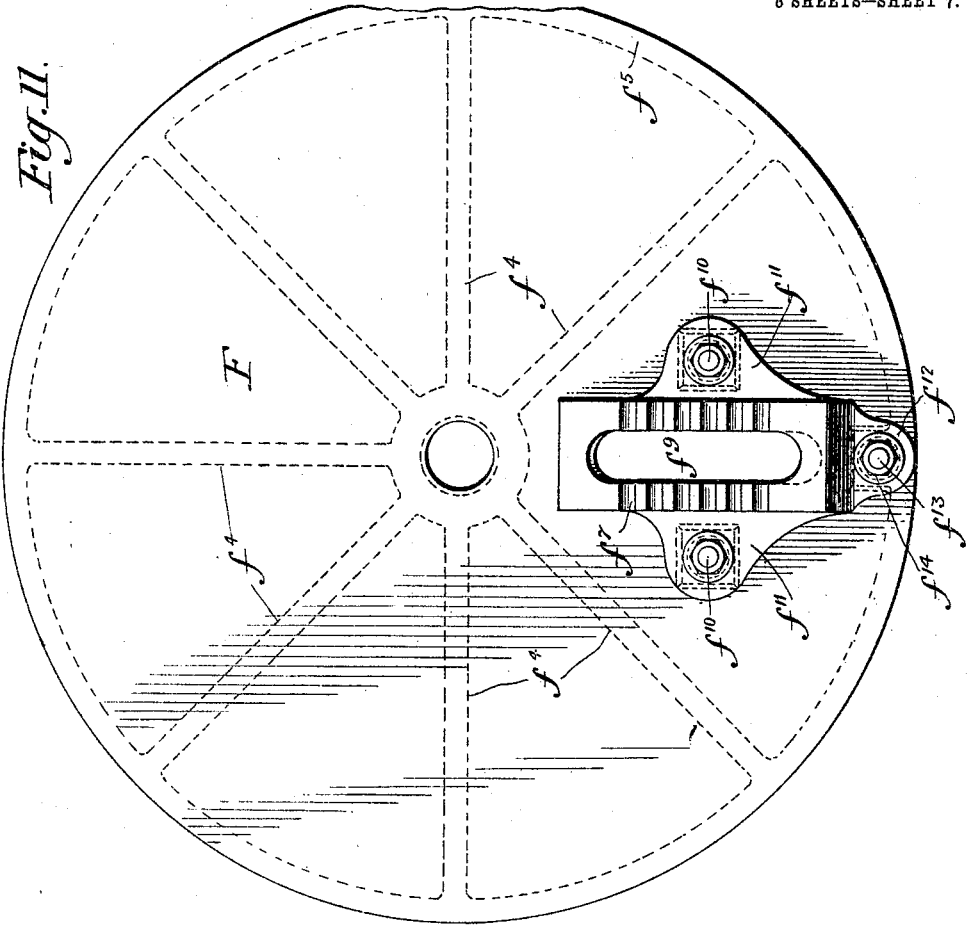
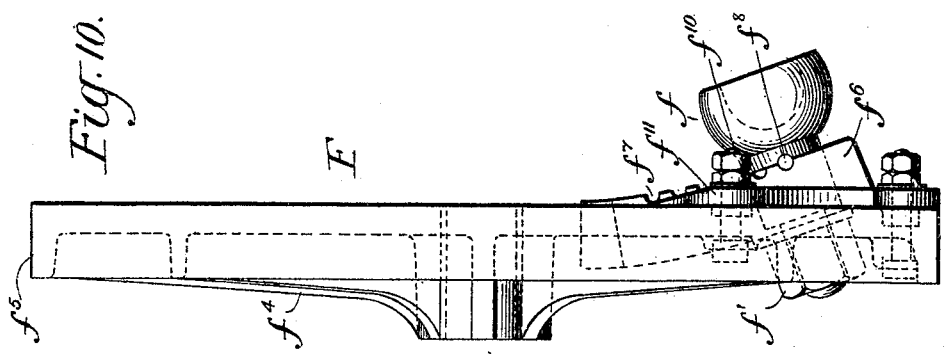

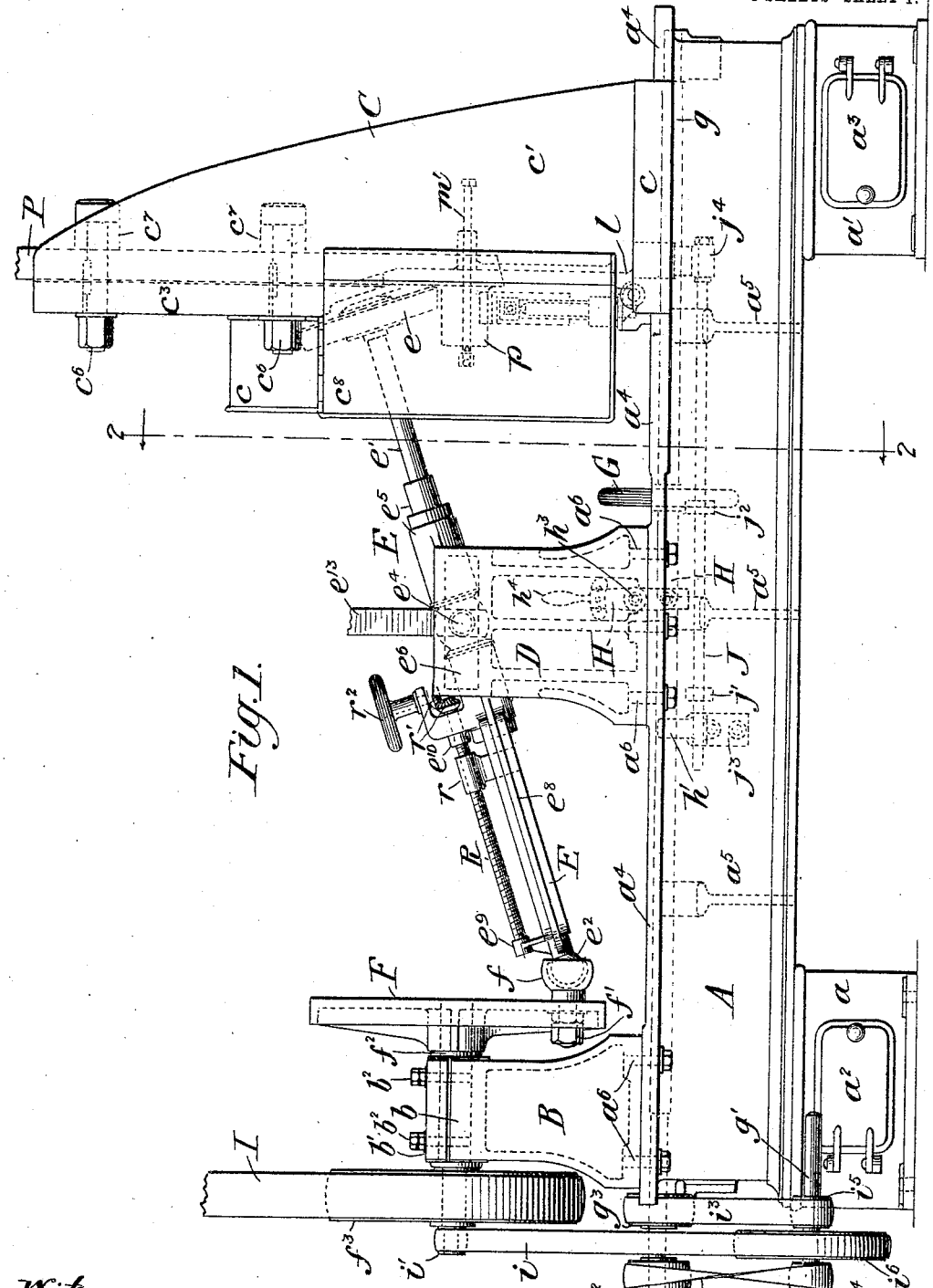

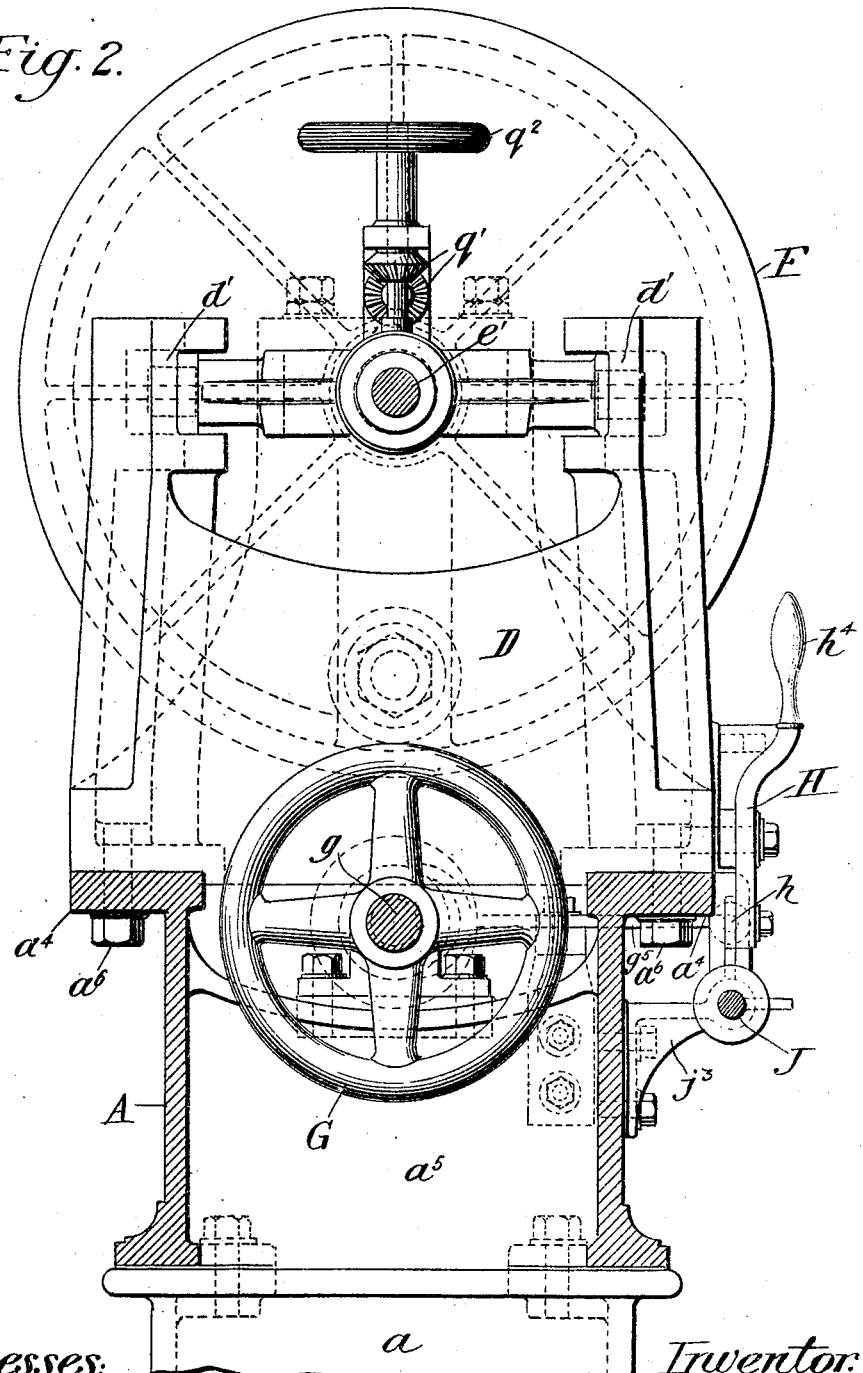

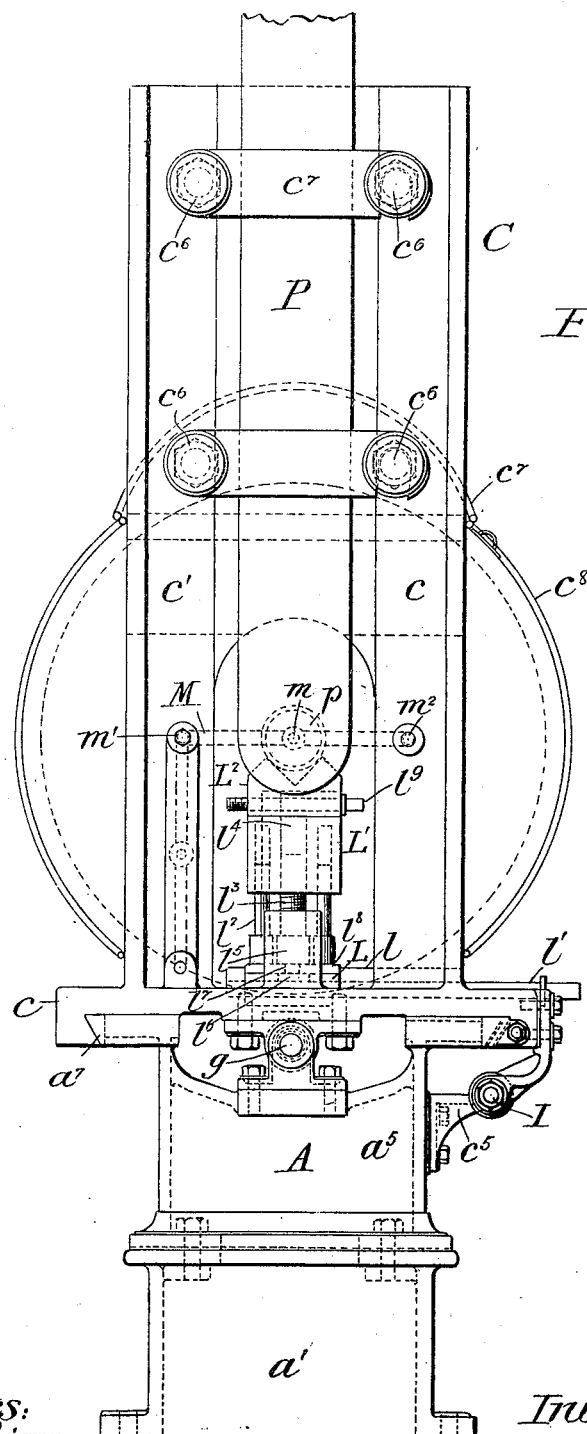

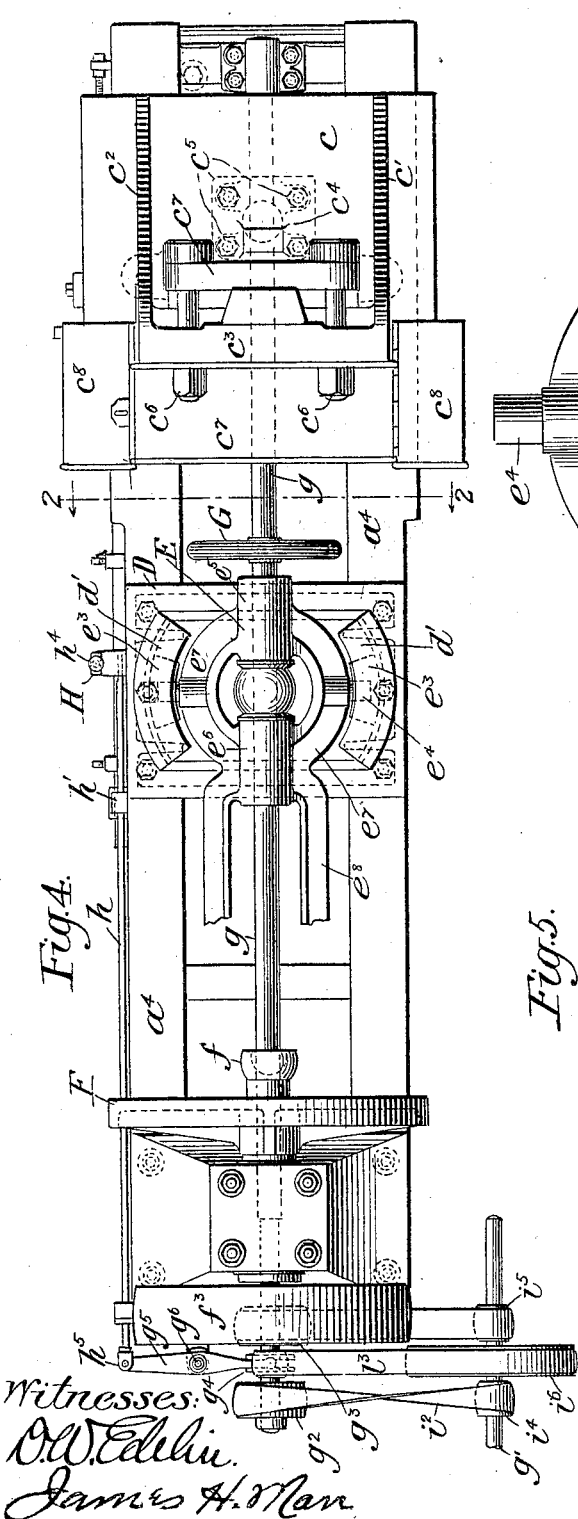
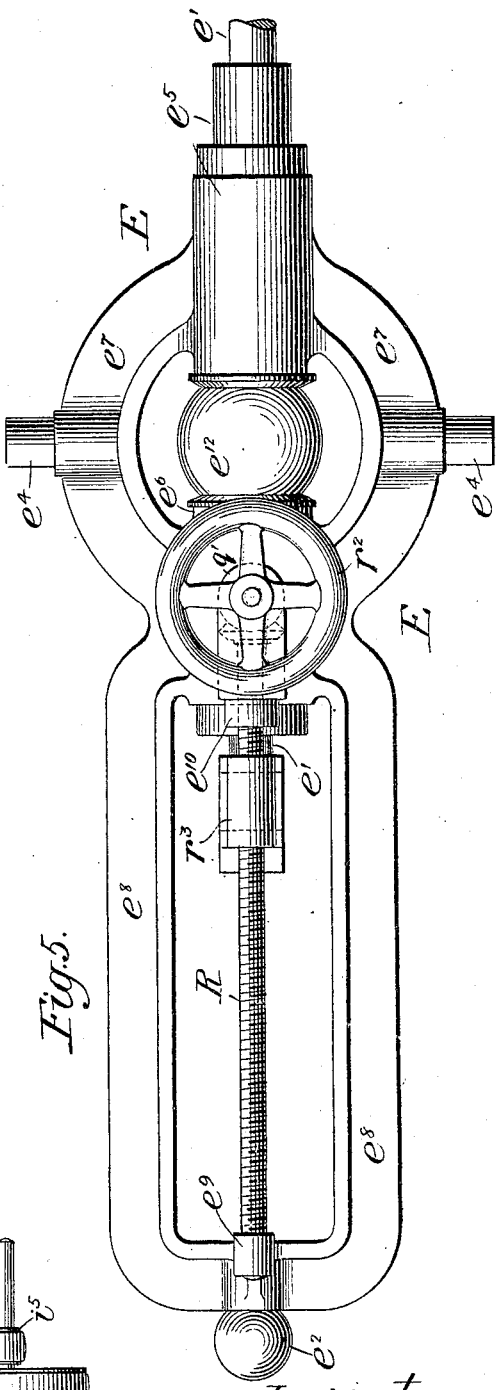

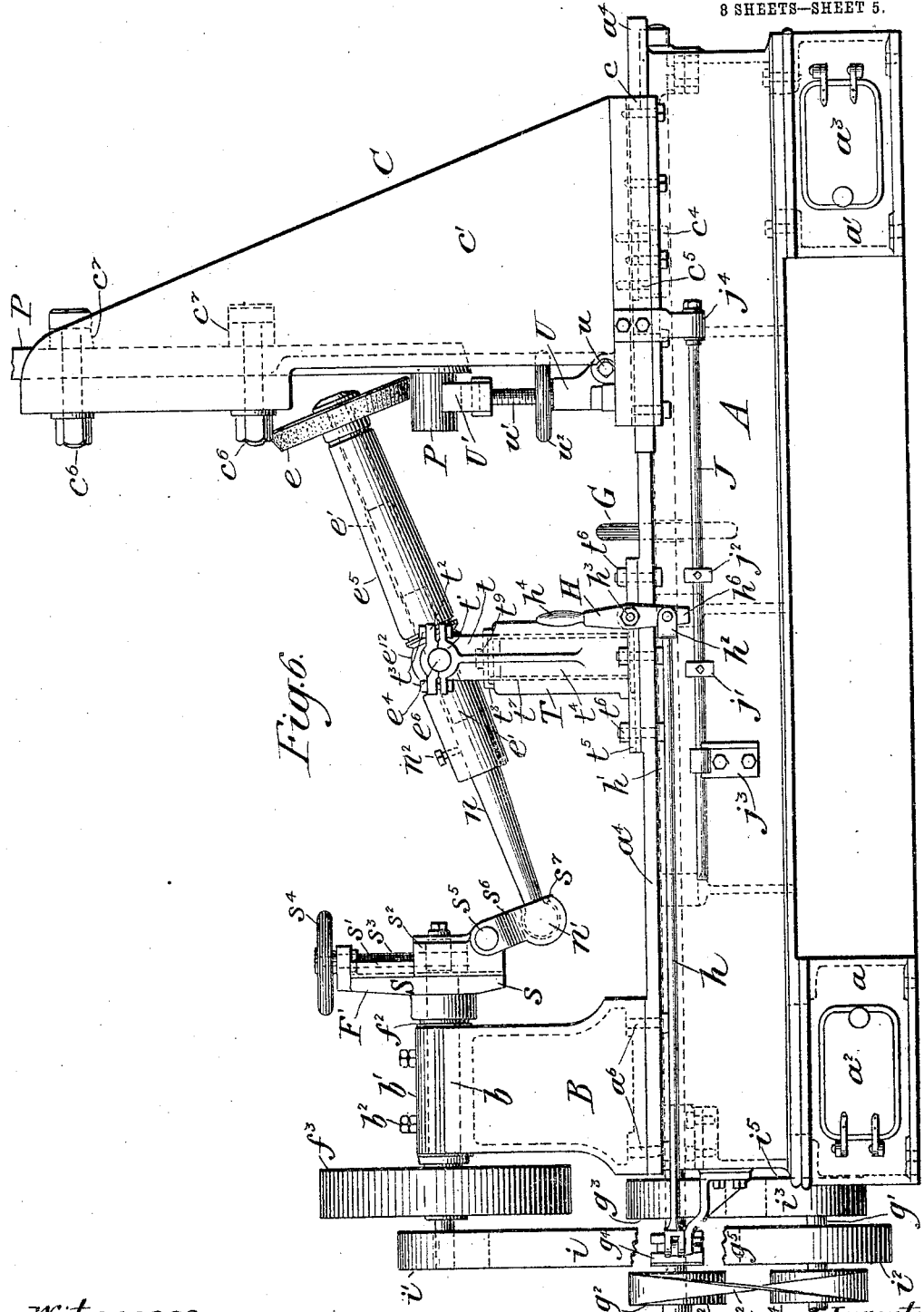

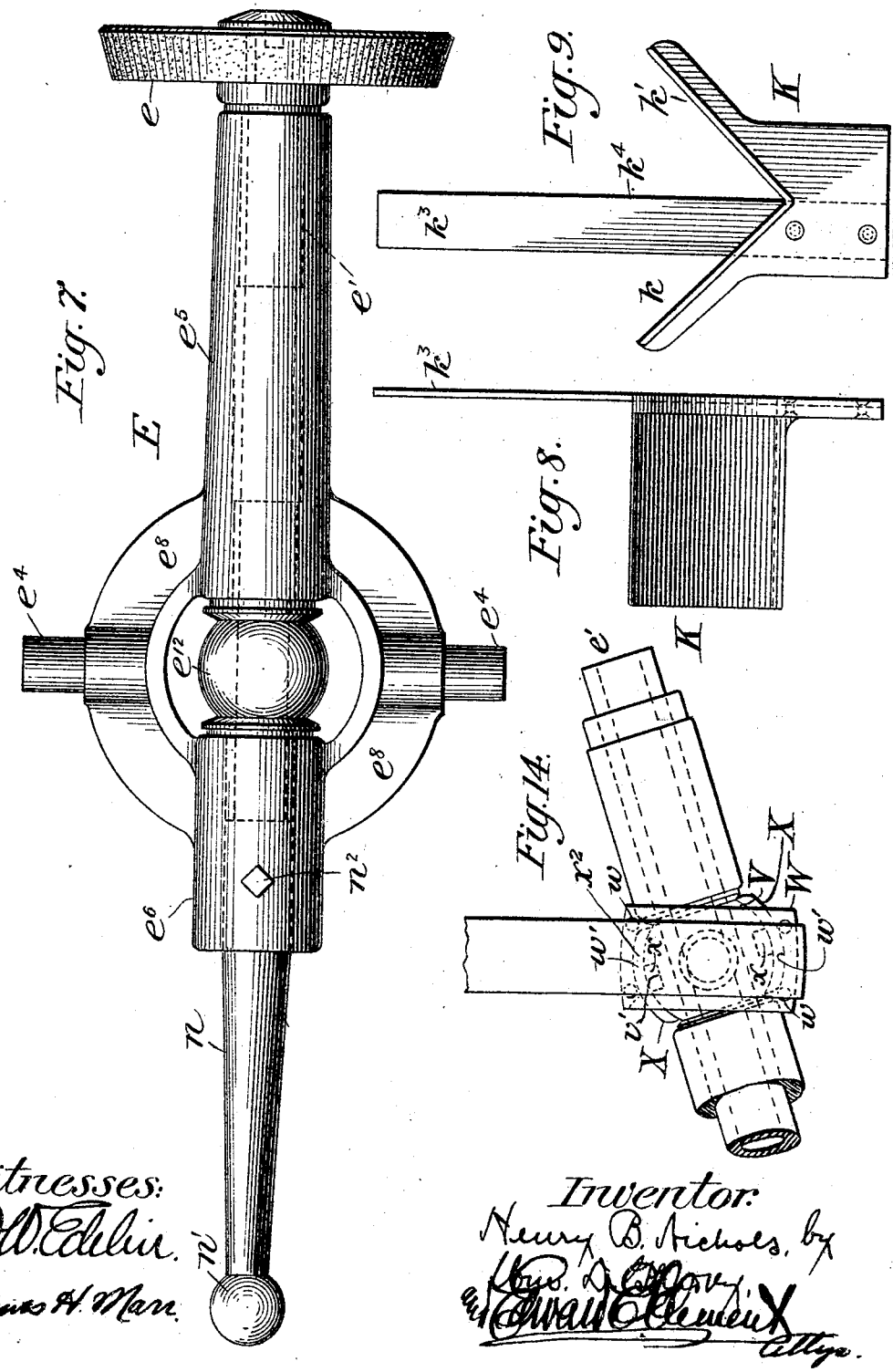

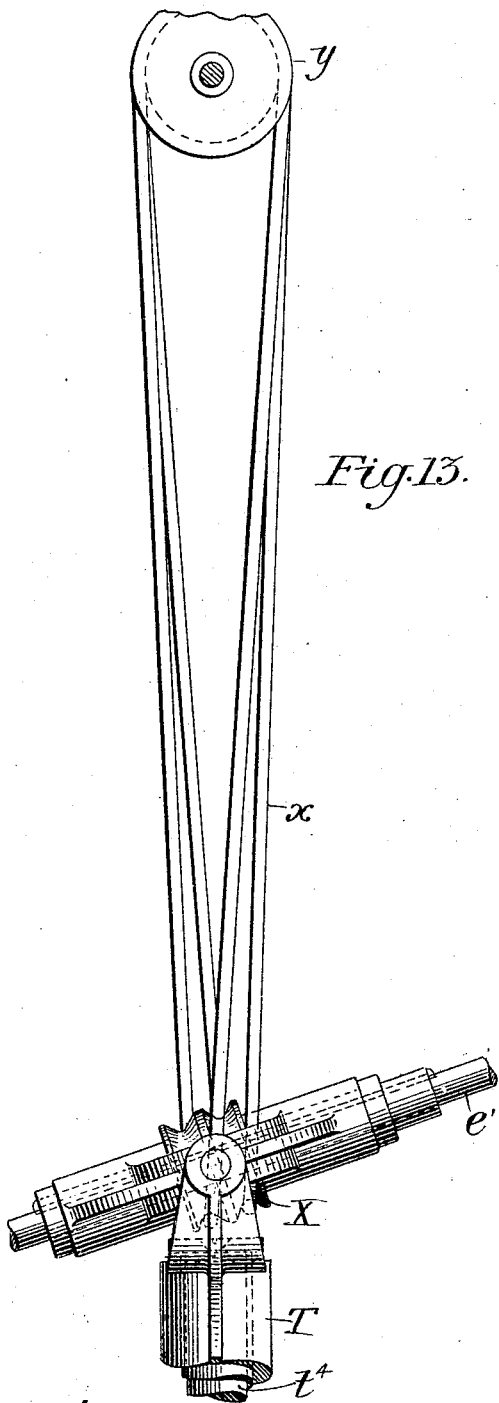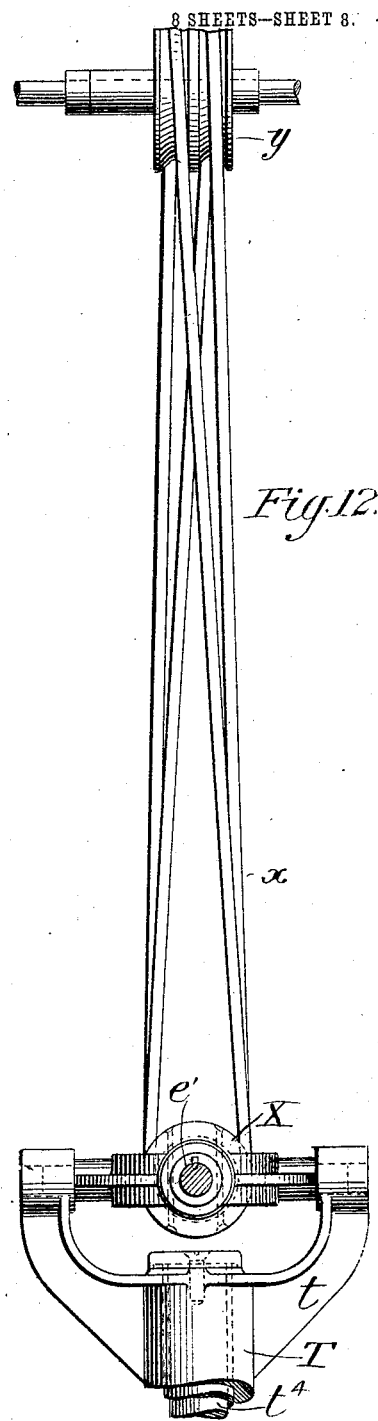

UNITED STATES PATENT OFFICE.

HENRY B. NICHOLS, OF PHILADELPHIA, PENNSYLVANIA.

GRINDING-MACHINE.

No. 807,193.        Specification of Letters Patent.        Patented Dec. 12, 1905.

Application filed February 28, 1905. Serial No. 247,745.

*To all whom it may concern:*

Be it known that I, HENRY B. NICHOLS, a citizen of the United States, residing in the city and county of Philadelphia, State of Pennsylvania, have invented certain new and useful Improvements in Grinding-Machines, of which the following is a specification, reference being had therein to the accompanying drawings.

My invention relates to grinding machinery, and particularly to such machines as are intended for the handling of heavy or irregular shapes. Specifically stated, it has reference to machines for grinding the pins or pivots of railway-switch tongues.

Switch-tongues according to the best practice are made with their pivot-pins integral, the same being forged or otherwise secured directly to the tongues, and as the length of most railway-switch tongues is considerable and out of all proportion to their other dimensions it would obviously be impossible to rotate such a piece around the axis or its pivot-pin as a center, because this pin projects laterally at one end of the tongue. Although these pins are made of the hardest kind of steel procurable, such as manganese steel, they wear out of true circular form by continued use. It then becomes necessary to discard the entire switch-tongue, which may not itself be worn appreciably, or else true up the pivot-pin, and it is for the purpose of conveniently, accurately, and economically performing this function that my machine has been particularly designed.

Stated generally, my present invention comprises a machine built on the lines of an engine-lathe or similar tool having a supporting-bed and head and tail stocks thereon. It has been demonstrated that in order to handle the heavy work here under consideration with success the work must be kept fixed or at least must have no swing or other motion which would make a sweep of its larger dimensions. Hence I have chosen to clamp the work to a support which permits of its being accurately centered and which can have a feed in one direction. I then mount the cutting or grinding tool so that it will have a swing to supply this motion which is ordinarily given the work. In addition to the swing the tool must be and is driven for the cut, preferably by rotation, as the simplest motion to communicate. This in turn calls for special devices to permit the transmission of power to the tool during its swing and that will maintain the power approximately uniform. This is really one of the most important features of the invention, as without proper drive for the tool the other arrangements are futile. I secure the necessary swing and drive by mounting the tool-spindle in a bracket carrying bearings, which I shall for convenience denominate the "bracket-bearing" hereinafter, giving this bracket universal or other motion as required and communicating power to the spindle by belt or geared drive having one element stationary outside the machine and another carried on the tool-bracket and supplied with compensating means to maintain the transmission constant. In another application, Serial No. 247,746, filed of even date with this application, I have shown and claimed a drive for this same type of machine wherein one element of the mechanism is fixed on the machine and the other travels with the tool swing, but always engages the first element positively. The same is included in the claims of the present case; but I do not specifically claim it herein. As stated, however, and as will be obvious to those skilled in the art, my invention is not limited to the specific work mentioned, as it is equally applicable to truing lateral circular projections on any large object.

In the accompanying eight sheets of drawings, Figure 1 is a side elevation of a machine for truing the pivot-pins of switch-tongues and the like constructed according to my invention. Fig. 2 is an enlarged cross-section of the same on the line 2 2 of Figs. 1 and 4 looking in the direction of the arrows. Fig. 3 is a rear elevation of the same looking from the right in Fig. 1. Fig. 4 is a plan view of Fig. 1 with the grinding-wheel spindle removed and a part of the bracket-bearing of the same broken away. Fig. 5 is a detail plan view of the grinding-wheel spindle and its bracket-bearing. Fig. 6 is a side elevation of a modified form of the machine. Fig. 7 is a detail plan view of the emery-wheel spindle and its bracket-bearing of said modified machine. Figs. 8 and 9 are respectively side and end elevations of a device used in determining the center of the worn pivot-pin. Fig. 10 is a side elevation of a modified form of face-plate. Fig. 11 is an end elevation of the same. Figs. 12 and 13 are a plan and side elevation, respectively, of a modified drive for the grinding-wheel spindle. Fig. 14 shows a modification of the driving-pulley for the tool-spindle.

Referring first to the machine shown in Figs. 1 to 5, the bed of the machine is represented at A, the same being constructed of a horizontally-arranged box-casing similar in construction to the bed of an engine-lathe or grinding-machine and suitably braced at $a^5$ $a^5$ $a^5$. Said bed is supported on legs or standards $a$ $a'$, which are preferably in the form of hollow castings, constituting receptacles for tools, wrenches, &c., and provided with doors $a^2$ $a^3$. The upper part of the said bed A is machined to form ways $a^4$ $a^4$, to which are bolted at $a^6$ $a^6$ the head-stock B and the tool-support D. The tail-stock or work-support C is slidably mounted on said ways $a^4$, as indicated in Figs. 1 and 3, and is adapted to be fed along said ways by means to be hereinafter described.

The head-stock B comprises a standard bolted, as stated, to the bed A and provided with a journal-bearing $b$, having the cap $b'$ secured thereto by bolts $b^2$ for the reception of the live-spindle $f^2$, which carries on its inner end the face-plate F and on its outer end the pulley $f^3$, the latter being driven from any suitable or convenient line-shaft or counter-shaft by a belt I.

To the face-plate F is secured, by means of a bolt $f'$, the semispherical socket member $f$, which receives the spherical member or ball $e^2$, formed on the end of the bracket-bearing E of the emery-wheel spindle $e'$, to be hereinafter further described.

The tool-support D consists of a casting bolted to the bed, as stated above, and having formed in its upper end segmental guideways $d'$, (see Figs. 2 and 4,) in which are slidably mounted the segmental shoes $e^3$, provided with bearings for the trunnions $e^4$ $e^4$ of the said bracket-bearing E.

The tail-stock or work-support C consists, essentially, of a base-plate $c$, having cast therewith two massive uprights $c'$ and $c^2$, united by the front plates $c^3$ and adapted and arranged, as stated above, to be fed along the ways $a^4$ of the bed A by the following mechanism: Journaled centrally and longitudinally of the bed A is the lead-screw $g$, which engages a nut $c^4$, secured to the tail-stock C by bolts $c^5$ (see Fig. 4) or in any other convenient way. Said lead-screw $g$ is driven from the live-spindle $f^2$ by a pulley $i'$ on said spindle, a belt $i$, running on said pulley and on another pulley $i^6$, carried by a counter-shaft $g'$, supported in suitable journal-bearings, (not shown,) and by the belts $i^2$ and $i^3$, driven, respectively, by the pulleys $i^4$ and $i^5$, carried on the said counter-shaft $g'$ and driving, respectively, the pulleys $g^2$ and $g^3$, which are loosely mounted on said lead-screw $g$. One of these belts, as $i^2$, is crossed, as shown, so that the pulley $g^2$ is driven in the reverse direction from the pulley $g^3$. The pulleys $g^2$ $g^3$ are adapted to be alternately clutched to the lead-screw $g$ by means of the yoke $g^4$, carrying suitable clutch-surfaces adapted to coöperate with conjugate clutch-surfaces on the said pulleys $g^2$ $g^3$ and slidably keyed to said lead-screw $g$. Said yoke $g^4$ is actuated by the lever $g^5$, pivoted at $g^6$ on the bed A. (See Fig. 4.) Said lever and clutch can be either manually or automatically actuated by means of the rod $h$, which is pivotally connected at $h^5$ to the free end of said lever $g^5$ and which is guided for reciprocal movement in suitable bearings $h'$ on the frame. The other end of said rod $h$ is pivotally connected by a yoke $h^2$ (see Fig. 6) to the lower end of a hand-lever H, which in turn is pivoted at $h^3$ to the tool support or standard D and is provided at its upper end with a handle $h^4$. Said lever H is extended below the yoke $h^2$, as shown at $h^6$, where it is in position to be struck by the adjustable dogs $j'$ and $j^2$, carried on a rod J, which is guided in a suitable bearing $j^3$, bolted to the bed A, and is connected at its end to a bracket $j^4$ on the tail-stock or work-support C.

Fast on the lead-screw $g$ is a hand-wheel G, by which the tail-stock or work-support C is fed by hand. The automatic feed of said work-support by the mechanism just described will be apparent. By shifting the yoke $g^4$ in one or the other direction by means of the lever H the lead-screw $g$ will be rotated in one or the other direction by means of the belts $i$ and $i^2$ or $i$ and $i^3$, as the case may be, and when the tail-stock C, to which the rod J is secured, has traveled sufficiently far to bring either one of the dogs $j'$ or $j^2$ into contact with the lower end $h^4$ of the lever H the yoke $g^4$ and its connected clutch mechanism will be shifted to the intermediate position and the travel of the work-support stopped. At that time it can be fed either way by hand by means of the hand-wheel G. When it is desired to throw in the automatic feed again, the lever H is shifted by hand into the proper position.

The truing-tool $e$, which, as shown, is an emery-wheel, is carried by the spindle $e'$, journaled in the bracket-bearing E, above mentioned, which is carried by its trunnions $e^4$ $e^4$, journaled in the segmental shoes $e^3$ $e^3$. It will thus be seen that said spindle $e'$ can oscillate both in a vertical and in a horizontal plane—in other words, has a universal movement.

The bracket-bearing E consists of two hollow cylindrical members or bosses $e^5$ $e^6$, connected by yokes $e^7$ $e^7$, the latter carrying the trunnions $e^4$ $e^4$, and an elongated yoke $e^8$, projecting rearwardly from the boss $e^6$, said yoke $e^8$ having formed on its end the ball or spherical member $e^2$ and carrying bearings $e^9$ $e^{10}$ for a feed-screw R, the purpose of which will be hereinafter described.

The spindle $e'$ is driven in the present instance by a belt $e^{13}$, which transmits power to said spindle through a spherical pulley $e^{12}$, which is splined on said spindle to permit the latter to move longitudinally therein. As will be seen by reference to Fig. 1, this belt $e^{13}$ runs in a vertical plane passing through the axes of the spherical pulley $e^{12}$ and of the trunnions $e^4$ $e^4$, it being thus enabled to drive said pulley and spindle $e'$ throughout all the different angular positions which the latter is caused to assume during the operation of the machine.

By the rotation of the face-plate F the bracket-bearing E and the spindle $e'$ are caused to oscillate on the trunnions $e^4$ $e^4$ of the former and at the same time to swing laterally about a vertical axis through the center of said bracket by reason of the sliding of the segmental shoes $e^3$ in the arc-shaped guideways $d'$. The opposite end of the spindle $e'$, which carries the emery-wheel $e$, is thus caused to travel in a circle, the radius of which is determined by the radial distance of the socket $f$ from the axis of the face-plate F.

The work-piece which is represented at P as a railway-switch tongue having the pivot-pin $p$ projecting therefrom, which latter it is the purpose of this machine to true, is clamped in a vertical position to the tail-stock or work-support C by means of the bolts $c^6$ and cross-pieces $c^7$ or other suitable means.

It is essential that the work be so placed in the machine that no more metal will be removed from the pin $p$ than is necessary to true the same to circular cross-section. To this end the following procedure is resorted to: First, the approximate center of the pin is determined by means of the instrument K represented in Figs. 8 and 9. The same comprises a V-shaped jaw, the sides $k$ and $k'$ of which are at right angles to each other and of considerable length, approximating the length of the pin to be centered, and a straight-edge $k^3$, having one of its edges $k^4$ bisecting the right angle formed by the said sides $k$ and $k'$. This jaw being applied to a pin to be trued, which has usually been worn into a more or less oval shape, a line is scribed by means of the edge $k^4$ on the end of the pin. The jaw is then shifted around the pin a little way and another line is scribed. By continuing this operation a certain area at the center of the pin will be defined by the scribed lines, and the geometric center of the oval or irregular figure determined by the periphery of the worn pin can consequently be closely determined. In order to facilitate the accurate placing of this center point in line with the axis of the machine, which is the axis of the spindle $f^2$, and in the horizontal plane containing which are the axes of the trunnions $e^4$ $e^4$, the following means is provided: A block L is slidably mounted on transverse guideways $l$, formed on the base-plate $c$, and is movable thereon by the feed-screw $l'$. Two guide-pins $l^2$ project upwardly from said block and engage apertures in a second block L', which is vertically adjustable by means of the adjusting-screws $l^3$, engaging the screw-threaded aperture $l^4$ in said block L'. The screw $l^3$ is provided with the circular knurled portion $l^5$, between which and the final circular head $l^6$ of said screw is the reduced neck portion $l^7$. A retaining-plate $l^8$, secured to the block L, engages said reduced neck portion $l^7$ and serves to retain the adjusting-screw $l^3$ in place. To vertically adjust the block L', the screw $l^3$ is turned by means of the knurled portion $l^5$, which is or may be also provided with an aperture (not shown) for the insertion of a spanner or wrench. Transversely slidable by means of the adjusting-screw $l^9$ on ways formed on the upper side of the block L' is the V-rest $L^2$, adapted to engage the lower side of the pivot-pin to be trued. By means of these various adjustments said pin can be readily moved vertically and laterally, as will be obvious, to bring its center in alinement with the axis of the machine.

In order to determine when the center of the space defined by the lines scribed on the end of the pin in the manner described above is in the correct position, an arm M is provided, pivoted on the bolt $m'$, slidably carried in an aperture formed in the upright $c'$. The free end of the arm carries a pin or bolt $m^2$, adapted to engage in a similar aperture formed in the other upright $c$ on the same lever with the aperture for the bolt $m'$. The arm M carries midway between its ends a center point $m$, which when the arm M is raised to its horizontal position and the pin $m^2$ is inserted in its aperture is directly in line with the axis of the machine. After the center of the pin to be trued has been brought in line with this point $m$ the pin or bolt $m^2$ is withdrawn from its aperture, the bolt $m'$ being simultaneously partially drawn out of its aperture, and the arm M is allowed to swing down into a vertical position where it is out of the way. The block L' is then lowered to disengage the V-rest $L^2$ from the pin $p$ and the block L is withdrawn laterally from under said pin by means of the screw $l'$, thus leaving the pin free to be acted upon by the emery-wheel or tool $e$. Of course after the work has thus been centered the bolts $c^6$ will be tightened to clamp the work securely in place.

The feed of the grinding-wheel $e$ inwardly—that is, radially—of the work is accomplished in the embodiment of my invention now being described by means of the feed-screw R, above referred to, which is journaled, as stated, in the bearings $e^9$ $e^{10}$, formed on the yoke $e^8$ of the bracket-bearing E.

Secured to the spindle $e'$ is the nut $r$, which engages said feed-screw, which is arranged to be manually rotated by means of the hand-wheel $r^2$ and miter-gears $r'$, as will be apparent from an inspection of Fig. 1.

The operation of the machine just described, which, as stated, is but one form in which my invention may be embodied, is as follows: The switch-tongue P is placed approximately in correct position in the tail-stock C and held by the clamps $c^7$ after the center of the irregularly-worn pin $p$ has been approximately determined by use of the instrument K in the manner described. The bar M is then swung up to the horizontal position, with its pin $m^2$ inserted in the aperture in the upright $c$ and its center point accurately indicating the axial line of the machine. By means of the blocks L and L' and their adjusting-screws the pin $p$ is then adjusted until its center is opposite the point $m$, when the bolts $c^6$ are tightened to secure the work in that position, and the bar $m$ and blocks L and L' are withdrawn from their operative position. The machine is then started by setting the belt I, and consequently the face-plate F, in motion, and the revolutions of the socket $f$, carried by the latter, cause the oscillation, in both vertical and horizontal planes, of the bracket-bearing E and the spindle $e'$. The belt $e^{13}$, being also started, causes the spindle $e'$ and the emery-wheel $e$ also to rotate, so that the wheel is carried around the pin $p$, while at the same time rotating at a high speed. By manipulating the hand-wheel $r^2$ the feed-screw R is turned to bring the wheel $e$ down into contact with the periphery of the pin $p$, the tail-stock C being adjusted to bring the wheel $e$ into the shoulder of the pin, as shown in Fig. 1. As soon as the wheel has been fed down far enough so that it commences to contact with and remove metal from the surface of the pin $p$ the automatic feed of the tail-stock C is thrown in by shifting the hand-lever H in the suitable direction to cause the yoke $g^4$ to throw one of its clutch-surfaces into engagement with the coöperating clutch-surface on the appropriate pulley $g^2$ or $g^3$. This causes a relatively slow backward feed of the tail-stock C relatively to the path described by the grinding-wheel, and this is continued until eventually the pin $p$ is entirely withdrawn from the path of the wheel, and if the stop $j^2$ has previously been adjusted to the proper position on the rod J it comes into contact with the extension $h^6$ of the hand-lever H and through the rod $h$ shifts the clutch-yoke $g^4$ to its central and inoperative position. The tail-stock may be fed automatically in the opposite direction, if desired; but in practice it is preferable to commence the grinding at the shoulder and work outward. The hand-wheel $r^2$ is turned to feed the grinding-wheel radially inward a slight amount for the next cut.

While the majority of switch-tongues in use are provided with pivot-pins of substantially the same diameter, it is desirable to provide a machine of this kind with readily-adjustable means for varying the diameter of the path of travel of the grinding-wheel without depending alone on the longitudinal movement of the spindle $e'$ by the feed-screw R. My invention comprises means for accomplishing such adjustment of the diameter of the circle described by the grinding-wheel by providing for the radial adjustment of the socket carried by the face-plate which engages the end of the grinding-spindle bracket-bearing. One form of this modified adjusting means is shown in Fig. 6, which represents a machine similar in general construction and operation to the machine just described, but modified in the matter of the said radial adjustment and in some few other particulars. (See also Fig. 7, which is a detail of the modified grinding-wheel spindle.) The same letters of reference have been used in representing this modified machine for all the parts which are identical, or substantially so, with the similar parts of the machine first described. Thus, referring to Fig. 6, the bed A, having the ways $a^4$ and supported on the standards $a$ and $a'$, provided with the doors $a^2$ $a^3$; the head-stock B, having journal-bearing $b$ and cap $b'$; the work-support C, composed of the base-plate and uprights $c'$ and $c^2$, are each identical with the same parts already described. The head-stock spindle $f^2$ carries the pulley $f^3$, by which it is driven, and the pulley $i'$ the pulley $i^2$ on the counter-shaft $g'$, which latter drives the lead-screw $g$ in one or the other direction either by the pulley $i^4$, belt $i^2$, and pulley $g^2$ or else by the pulley $i^5$, belt $i^3$, and pulley $g^3$, according to whether the pulley $g^2$ or the pulley $g^3$ is clutched to said lead-screw, all in the manner and arrangement previously described. Similarly the yoke $g^4$, lever $g^5$, rod $h$, lever H, shifter J, carrying dogs $j'$ and $j^2$ and connected to the tail-stock C at $j^4$, are unchanged excepting that in this instance these parts are arranged on the opposite side of the machine from that on which they were arranged in the machine of Fig. 1, et seq. Lead-screw $g$ is provided with hand-wheel G and engages nut $c^4$ on the tail-stock, as above described, and the tail-stock is provided with the same clamping means $c^6$ $c^7$ for the work.

So far this machine is substantially identical with the former machine; but the remaining parts are somewhat modified.

The emery-wheel $e$ is carried by a spindle $e'$, which is journaled in sleeves or bosses $e^5$ $e^6$, forming part of the bracket-casting, which is provided with the trunnions $e^4$ $e^4$. Fast on spindle $e'$ is the spherical pulley $e^{12}$. Thus far the construction only differs from that previously described in that the sleeve-bearing $e^5$ extends up to the hub of the emery-wheel and the spindle is not slidably mounted within said bearing and pulley $e^{12}$.

In the present form of my invention spindle $e'$ extends only part way through the bearing-sleeve $e^6$, which receives also the end of a spindle $n$, adjustably secured therein by a set-screw $n^2$ and having formed on its other end a ball or spherical member $n'$, which engages the spherical socket $s^7$, formed in a bracket $s^6$, pivoted at $s^5$ to a slide $s^2$, radially adjustable on ways $s'$, formed on the face-plate S by means of the screw $s^3$ and hand-wheel $s^4$. The diameter of the circle described by the active point of the periphery of the grinding-wheel $e$ can thus be varied within large limits by running said slide $s^2$ farther from or nearer to the axis of the spindle $f^2$. The distance also between the axes of the trunnions $e^4$ and the center of the ball $n'$ can be varied by loosening the set-screw $n^2$ and sliding the spindle $n$ farther into or out of the sleeve $e^6$, the pivoted socket member $s^6$ permitting such adjustment within certain limits.

The trunnions $e^4$ $e^4$ of the bracket-bearing E are carried in bearings $t'$, formed in the yoke-shaped or forked top $t$ of the work-support or standard T and provided with the usual bearing-caps $t^2$, secured by the bolts $t^3$. The standard T is hollow in its lower part, which is enlarged in diameter, as shown, and is rotatably mounted upon a post $t^4$, secured to or forming part of a plate $t^5$, bolted at $t^6$ to the ways $a^4$ of the bed A. A bushing $t^7$ is preferably interposed between said post $t^4$ and standard T, and a cap-plate $t^8$ secures, by means of a bolt $t^9$, the said standard T from rising off said post $t^4$.

The mechanism whereby the pin $p$ is centered is also somewhat modified in this machine. A block U is pivoted at $u$ to the base-plate $e$ of the tail-stock C, in the upper end of which block is formed a screw-threaded aperture, engaged by the vertical adjusting-screw $u'$, which carries swiveled on its upper end the V-block U′, constituting the centering-rest for the pin $p$. Fast on the screw $u'$ is the hand-wheel $u^2$, whereby the screw may be rotated. The work is first clamped in the tail-stock C in approximately correct position, and the block U being turned on its pivot into position under the pin, screw $u'$ is actuated by means of hand-wheel $u^2$ to bring the V-rest U′ up against the pin. This not only centers the pin laterally, but is also used to elevate or lower the pin until its center is in the correct position.

Figs. 10 and 11 illustrate a modified form of face-plate, in which the radial adjustment of the spherical socket member is obtained by different means than that hereinbefore described.

The face-plate F consists, as in the machine first described, of a circular cast plate provided with the usual ribs $f^4$ and flange $f^5$. Between two of said ribs $f^4$ the face-plate is cut away, and an arc-shaped casting $f^6$, slotted at $f^9$, is secured to the face-plate by bolts $f^{10}$. The socket member $f$ is substantially of the same construction as in the previously-described machine, and it is secured in place on the face-plate by passing its shank through the slot $f^9$ and the aperture in the face-plate and applying the nut F′ to the outer end of said shank. The front face of the casting $f^6$ on each side of the slot $f^9$ is provided with transverse grooves $f^7$, and a pin $f^8$, passed through a transverse aperture in the shank of the socket member, engages in one or the other of said grooves, according as the size of the work to be trued, and consequently the amount of radial distance of said socket member from the axis, may require.

In Fig. 14 I have shown a modification of the spherical pulley $e^{12}$, in which the member carrying the belt-engaging surface is mounted to oscillate on the member having the spherical surface, whereby all relative movement, and consequently friction between the belt and pulley-surface, is obviated and the belt more readily accommodates itself to the constantly-recurring variations in the angular positions of the grinding-wheel spindle. The central and spherical member is shown at V and may be made integral or in halves, as desired, in which latter case it may be clamped in place on the spindle $e'$ by means of bolts or rivets uniting the two halves. Circular recesses $v'$ are drilled at two diametrically opposite points of this spherical member. The pulley proper, W, is made in two halves and clamped into the member V by means of screws $w$. A curved recess or groove $w'$ is cut in the inside periphery of the pulley W at each of two diametrically opposite points, said grooves constituting keyways for the keys X, which have the portions $x$, adapted to be held in the recesses $v'$ of the spherical member V, and the curved portions $x^2$, which engage the grooves $w'$ in the pulley member W, whereby the latter can oscillate laterally on the spherical member, but is prevented from any rotary motion relative thereto.

Other forms of driving mechanism for the grinding-wheel spindle $e'$ than the spherical pulley hereinbefore described may be employed, and in Figs. 12 and 13 I have illustrated one simple and efficient driving means for the said spindle, which may be substituted for the said spherical pulley-drive. In said figures the spindle $e'$ is shown journaled in a bracket-bearing E, provided with trunnions $e^4$, as before, the said trunnions being journaled in the arms $t$ of the yoke T, which is freely rotatable on a vertical stud $t^4$. The construction is so far similar to that shown in Fig. 6. Instead, however, of the spherical pulley $e^{12}$ shown in said figure, I secure in this case to the said spindle, through an intermediate sleeve, if desired, a double-grooved pulley and drive the same by a round belt, which passes twice around a similar pulley on the driving-line or counter-shaft. The belt passes successively around the grooves of the said pulleys, as indicated by the arrows in Figs. 12 and 13. It will be seen that this construction is equally operative no matter what the angular position of the spindle $e$ may be, since when one part of the belt is shortened the other part is correspondingly lengthened. In other words, the average distance between the two grooves of the pulley $x$ and those of the pulley $y$ remain constant.

Obviously other modifications of the driving means for the grinding-wheel spindle may also be employed without departing from the spirit of my invention.

In the following claims I have referred to my machine as one for "grinding." This is for definition and not for limitation, and I consider and desire it understood that any type of metal-working machine whatever or any woodworking-machine or any other machine in which the combination of mechanical motions here described would be applicable is within the scope and purview of my claims. I wish also to state that while I have described the machine as grinding around the outside of the work it can obviously be used for grinding internally or for cutting or working internally hollow objects, such as tubular shafts or jackets, the bore of guns, and the like.

Having thus described my invention, what I claim, and desire to secure by Letters Patent, is—

1. In a grinding-machine, the combination with a work-support of a tool-support, a tool-spindle swiveled for universal movement therein, means for adjusting said tool-spindle relative to said work, means to rotate said spindle operative in all the angular positions thereof, and means on the other side of said tool-support from said work-support to impart to said spindle a motion which will give the desired contour to the work.

2. In a grinding-machine, the combination with a work-support of a tool-support, a tool-spindle swiveled for universal movement therein, means for adjusting said tool-spindle relative to said work, means to rotate said spindle operative in all the angular positions thereof, means to guide said spindle to impart the desired contour to the work, and means to feed said work-support relatively to said tool-support.

3. In a grinding-machine, the combination with the frame thereof, of a work-support carried by said frame, a tool-support also carried by said frame, a tool-spindle mounted therein and means to rotate the same, means for adjusting said tool-spindle relative to said work, and driving means, also carried by said frame, and connected to the spindle to impart to the latter a shaping motion whereby the desired contour of the work may be produced.

4. In a grinding-machine, the combination with the frame thereof, of a work-support mounted upon said frame, means for feeding work-support, a tool-support also mounted upon the frame, and a cutting or grinding tool carried thereby so as to have universal motion thereon, means for driving said tool so as to impart to it a cutting motion, means for adjusting said tool-spindle relative to said work and other means to guide the tool to impart the desired contour to the work.

5. In a grinding-machine, a bed-plate, a work-support thereon, means for clamping work thereto, a cutting or grinding tool and a support therefor, the tool having longitudinal motion upon said support, and means for driving said tool.

6. In a grinding-machine, the combination with the frame thereof, of a tail-stock or work-support, a tool-support, and a head-stock carried by said frame, a tool-spindle carried by said tool-support with means for driving the same, means for adjusting said tool-spindle relative to said work and means carried by said head-stock for guiding the tool to impart the desired contour to the work.

7. In a grinding-machine, the combination with the frame thereof, of a tool-support fixed upon said frame, a tool-spindle movably mounted upon said support, a work-support or tail-stock movably carried by said frame, means to impart a cutting motion to said tool-spindle and tool, means to feed said tool-spindle in said support and means to feed said work-support relatively to said tool-support.

8. In a grinding-machine, the combination with the frame thereof, of a tail-stock or work-support slidably mounted thereon, means for clamping the work rigidly to said tail-stock, a tool-support mounted upon said frame, a head-stock secured to said frame, a tool-spindle swiveled on said tool-support, a cutting or grinding tool carried thereby, means to drive the same directly to impart thereto a cutting motion, means carried by said head-stock to impart a guiding motion to said tool-spindle, means connected with said head-stock to feed the work-support along the frame, and automatic means to reverse said feed.

9. In a grinding-machine, a box-frame composed of vertical webs with upper and lower flanges, a work-support slidably mounted at one end of said frame to slide upon the upper flange thereof, said support comprising side plates and clamping means between them for securing work-pieces of an elongated form, a tool-support secured intermediate of the ends of the frame to the upper flange thereof, a rotary tool and tool-holder mounted upon said tool-support so as to have universal motion thereon, driving means for imparting cutting motion to said tool, a third support bolted to said frame, and secondary driving means mounted thereon to drive the tool in a predetermined path with respect to the work held in the work-support.

10. In a metal-working machine, the combination of a tool-support, a tool-holder swiveled therein, a tool-spindle mounted for longitudinal adjustment in said tool-holder, a rotary face-plate, a universal-joint connection between said face-plate and tool-holder and means to rotate said tool-spindle.

11. In a metal-working machine, the combination of a tool-support, means rotatable on a vertical axis carried thereby, a tool-holder trunnioned in said means, a tool-spindle carried by said tool-holder, a rotary face-plate, a universal-joint connection between said face-plate and tool-spindle and means to rotate the latter.

12. In a machine of the class described, the combination of a standard, a tool-carrying member swiveled thereon for universal movement, a tool carried thereby, a work-support and means for feeding the same toward and away from said standard, and rotatable means on the other side of said standard from said work-support adapted and arranged to engage said tool-carrying member and to thereby cause the tool to travel in a curved path around the work.

13. In a machine of the class described, the combination of a standard, a bearing swiveled thereon for universal movement, a rotary tool-spindle journaled in said bearing and carrying a cutting or abrading tool, a work-support and means for feeding it toward and away from said standard, a rotatable face-plate located on the other side of said standard from said work-support, and means carried by said bearing adapted to engage said face-plate, whereby said bearing may be caused to carry said tool in a curved path around the work.

14. In a machine of the class described, the combination with a frame, a head-stock secured thereto and a work-support slidably mounted thereon, of an intermediate tool-support carrying horizontal, segmental guides, shoes slidably carried in said guides, a bearing provided with trunnions journaled in said shoes, a rotatable tool-spindle mounted in said bearing, a pulley centrally secured on said spindle between the trunnions of said bearing, rotatable means on said head-stock and connections therefrom to said bearing, whereby the latter is given a universal movement and the tool is carried in a curved path around the work.

15. In a machine of the class described, the combination of a work-support provided with means for clamping the work thereto, a tool-support provided at its upper end with horizontal segmental guides, shoes carried by said guides, a tool-carrying member provided with trunnions journaled in said shoes, a rotatable member located on the other side of said tool-support from said work-support and connections between said member and said bearing whereby the latter is given a universal swinging movement.

16. In a machine of the class described, the combination of a work-support, a tool-support, a bearing member universally swiveled on the latter, a tool-spindle journaled in said bearing member and carrying a cutting or abrading tool, a head-stock, a rotatable face-plate carried thereby, an extension on said bearing member adapted to engage said face-plate, a feed-screw journaled longitudinally in said extension and connections therefrom to said spindle, whereby the latter may be adjusted longitudinally in said bearing member, and the latter be given a universal movement to carry the tool in a curved path around the work.

17. In a machine of the class described, the combination of a tool-spindle, means to rotate the same and means to simultaneously give the same a universal motion about an intermediate point of its axis.

18. In a machine of the class described, the combination of a tool-spindle, means to give the same a universal motion about an intermediate point of its axis, means located about said intermediate point to rotate said spindle, a cutting or abrading tool carried at one end of said spindle, and means connected with the other end thereof to swing the same about said intermediate point, whereby said tool may be given an orbital motion and at the same time be rotated.

19. A machine of the class described, comprising a tool-support having horizontal segmental guideways formed on the upper end thereof, shoes carried in said guideways, a bearing member comprising two alined bearings, connected by yokes provided with trunnions journaled in said shoes, and a yoke-like extension, a tool-spindle journaled in said bearings, a pulley intermediate said bearings and fast on said spindle, a feed-screw longitudinally and centrally journaled in said extension, connections therefrom to said spindle, manual means to operate said feed-screw to adjust said spindle longitudinally in said bearings, a ball-like member on the end of said extension, a head-stock, a rotatable spindle journaled therein, a face-plate carried thereby, and a socket secured eccentrically on said face-plate and adapted to engage said ball-like member, whereby said bearing member and tool-spindle are given a universal movement and the latter is simultaneously rotated.

20. In a machine of the class described, the combination of a frame, a head-stock secured thereto, a spindle journaled therein, a face-plate carried on the inner end of said spindle and having the socket member of a universal joint eccentrically secured thereto, a tail-stock, provided with means to secure the work thereto, slidably mounted on said frame, a feed-screw for said tail-stock, connections from said live-spindle to drive said feed-screw in either direction, adjustable means adapted to be actuated by the movement of said tail-stock to stop the rotations of said feed-screw, a tool-support secured to said frame intermediate said head and tail stocks and a tool-carrying member universally swiveled on said tool-support, said tool-carrying member carrying the ball member of a universal joint adapted to engage in said socket member carried by the face-plate.

21. In a machine of the class described, the combination of a standard, a tool-carrying member universally swiveled thereon, a work-support on one side of said standard and a head-stock on the other side thereof, a live-spindle journaled in said head-stock and carrying on its inner end a face-plate provided with guideways, a block slidably mounted on said guideways, a feed-screw for said block, a driving member pivoted to said block, and connections between said driving member and said tool-carrying member, whereby rotation of said face-plate will impart a universal swinging movement to said tool-carrying member.

22. In a machine of the class described, the combination of a frame, a head-stock and a tool-support secured thereto, a tail-stock or work-support movable thereon, a bearing member universally swiveled on said tool-support, said member comprising two alined bearings connected by yokes carrying trunnions, a tool-spindle journaled in said bearings, a tool carried on the end of said spindle, means to rotate said spindle mounted on the same between said bearings, a live-spindle in said head-stock, a face-plate on said live-spindle, a block slidably carried on said face-plate, a driving member pivoted to said block, and a pitman connecting said driving member and one of the said sleeves of the bearing member.

23. In a machine of the class described, the combination of a frame, a head-stock secured thereto, a tail-stock slidably mounted thereon and provided with means to clamp the work and means to center the work, the latter means being arranged to be withdrawn from the work after the latter is accurately centered and securely clamped, a tool-spindle swiveled on said tool-support, and means carried by said head-stock to give said spindle a universal swinging movement, whereby the tool carried by said spindle can be moved in a curved path around the work.

24. In a machine of the class described, the combination of a tool-support, a tool-carrying member universally swiveled on said support, a head-stock carrying a rotatable face-plate, an arc-shaped slotted member secured to said face-plate having its center coinciding with the center of universal movement of said tool-carrying member, a socket member adjustably secured to said arc-shaped member and connections between said socket member and said tool-carrying member whereby rotation of the face-plate will impart a universal swinging movement to said tool-carrying member.

25. In a machine of the class described, the combination of a tool-support, a tool-carrying member universally swiveled on said support, a head-stock carrying a rotatable face-plate, an arc-shaped slotted member secured to said face-plate and having its center coinciding with the center of universal movement of said tool-carrying member, a socket member provided with a shank adapted to be inserted through the slot of said arc-shaped member, a nut on said shank to clamp said socket member in adjusted position, said shank being provided with an aperture and the front curved faces of said arc-shaped member being provided with semicircular grooves, a pin adapted to be passed through said aperture and engage in one pair of said grooves, and a pitman connecting said socket member and said tool-carrying member whereby rotation of the face-plate will impart a universal swinging movement to said tool-carrying member.

26. In a rotary-motion machine, the combination of a tool-support, a tool-spindle pivoted in said support, a pair of grooved pulleys secured to said spindle on each side of its pivoted axis, and a belt passing consecutively around said pulleys and similar pulleys on a suitable driving-shaft, whereby said spindle can be rotated by said belt in any angular position.

In testimony whereof I affix my signature in presence of two witnesses.

HENRY B. NICHOLS.

Witnesses:
   GEO. B. TAYLOR,
   C. B. VOYNOW.